Nov. 27, 1962 J. H. DRILLICK 3,065,835

HIGH SPEED SERIAL PRINTER APPARATUS

Filed March 28, 1961 2 Sheets-Sheet 1

INVENTOR.
JACOB H. DRILLICK

BY R. E. Geauque

ATTORNEY

INVENTOR.
JACOB H. DRILLICK

BY R. E. Grangue

ATTORNEY

United States Patent Office 3,065,835
Patented Nov. 27, 1962

3,065,835
HIGH SPEED SERIAL PRINTER APPARATUS

Jacob H. Drillick, Los Angeles, Calif., assignor to Photo-typograph Corporation, Van Nuys, Calif., a corporation of Delaware Filed Mar. 28, 1961, Ser. No. 98,816
14 Claims. (Cl. 197—2)

This invention relates to business machines of the type employing serial printers and the like and more specifically to sheet record handling apparatus for such machines which is capable of sequentially positioning a sheet record along orthogonal axes for serial printing.

High-speed printers of the type generally used in connection with automatic business machines, electronic digital computers, and/or high-speed telecommunication equipment have, generally, employed either a relatively stationary record and a mechanically translated printing mechanism or have used a stationary printing mechanism and a rapidly moving record carriage. In the first instance, the paper is held in a carriage which remains stationary during the print operation, as in the case in a teletypewriter or the like. In the latter instance, the record moves while the print mechanism remains relatively stationary as in the case of the well-known stock ticker. In either instance, it is necessary to overcome the inertia of the relatively large mass of either the record carriage or print mechanism carriage. By way of contrast, the present invention contemplates the use of a stationary printing device and a high-speed drive mechanism for selectively positioning only the paper or sheet record without the necessity of also positioning a paper-carrying carriage. That is, the sheet record is not supported by means of a moving carriage or its equivalent. This results in minimum inertia of the moving elements in the system and permits realization of a substantially higher operating speed. That is, the mass of the paper, hereinafter referred to as the record, is extremely low as compared with that of conventional paper carriages used heretofore.

A pair of continuously-rotating drive rollers are employed to drive the record in a first direction along a given coordinate axis, e.g. the "X" axis. A second pair of continuously driven contra-rotating drive rollers may be used to move the record in a reverse direction along the "X" axis. Similar sets of drive rollers are arranged at right angles in the same plane to provide forward and reverse motion to the record along the alternate or "Y" axis. The use of orthogonal drives in either direction permits the record to be moved to any coordinate intersection where it is desired to print a specific alpha-numeric character. A braking mechanism, designed to engage the record and operate out-of-phase with the drive mechanism, provides positive control over the record at all times. In this way, the record is positioned relative to the print station so that a selected character may be imprinted at any location on the record definable in terms of X and Y Cartesian coordinates. The actual printing device at the fixed print station may be any one of a variety of suitable and well-known configurations. For example, a wire printer of the 5 x 7 type may be employed in which a pattern, defined in terms of selected ones of 35 wires, is used to imprint a desired character on the obverse of the record. Means responsive to control markings on the reverse of the record are provided for generating control signals indicative of the instantaneous location of the record. Novel means are also provided for overcoming skew of the record during the positioning cycle.

Thus an object of this invention is to move and position a sheet record for the successive printing thereon of groups of alpha-numeric characters at high speeds.

It is another object of the invention to provide novel and improved means for sequentially positioning a sheet record at selected locations, defined in terms of Cartesian coordinates, relative to a fixed printing or reading station.

Another object of the invention is to provide novel and improved record handling apparatus for use in business machines.

Yet another object of the invention is to provide a bi-directional orthogonal drive system for positioning a sheet record in response to input control signals.

Still another object of the invention is to provide novel skew control means in a sheet record feeding mechanism which is automatically responsive to control signals generated by said record.

Still another object of the invention is to provide a novel and improved high-speed serial printer.

These and other objects of the invention will be more completely understood upon review of the following detailed description, taken in conjunction with the drawings, in which.

The invention resides partly in the physical and electrical structures and interrelationships embodied in the drive mechanism and the electric control components of the system as herein specifically illustrated, but also embraces the concept of the system itself, considered as an integrated whole, and independently of the structural details of its several parts. The useful applications of a system of this nature are many; by way of illustration, there is shown and described hereinafter the application of the invention to feeding paper sheets, having an aspect ratio of 8½ x 11, sequentially past a fixed print station. It should be understood, however, that other sheet records such as punched cards, bank checks, etc., may be substituted as full equivalents of paper sheets and that the fixed print station may be replaced by a reading or sensing station at which symbols or characters on the record may be scanned or read.

The novel drive mechanism of the invention, shown in FIGURES 1–3 and 6, advances a single record past the print station in either the X or the Y direction. By moving only the sheet of paper comprising the record, the inertia is kept extremely low.

Figure 1:
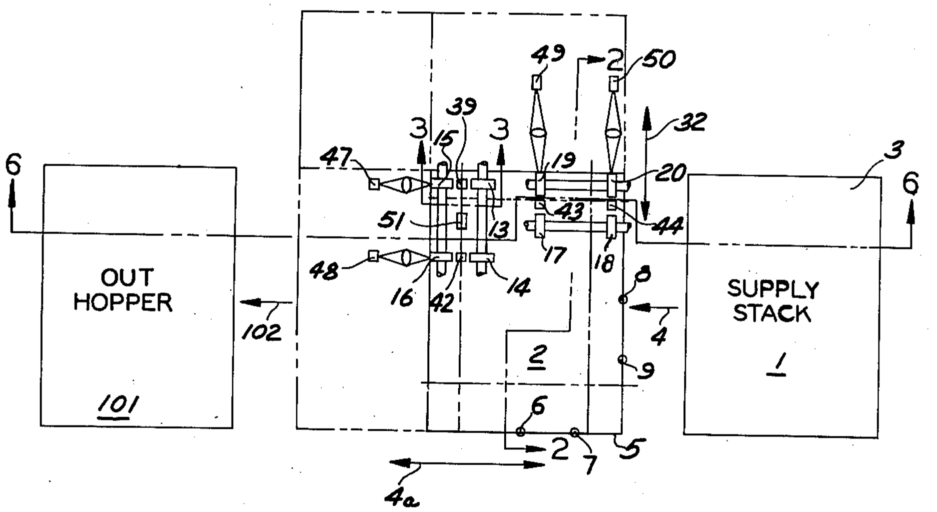
FIGURE 1 is a somewhat diagrammatic top plan view of an illustrative embodiment of the invention.
Figure 3:
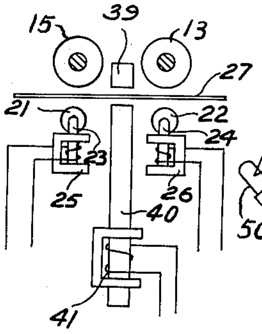
FIGURE 3 is a cross section taken along line 3—3 of FIGURE 1.

Looking now at FIGURE 1, a stack of record sheets, stored in a supply stack 1, is fed to an intermediate station, indicated generally by the number 2, by means of a sheet feeding mechanism, not shown, of any suitable and well-known construction. A variety of business and tabulating machines employ sheet feeding mechanisms in which paper records are transferred from a supply stack through a reading station or a printing station and thence into a stacker or receiving hopper. Any one of these conventional and well-known sheet feeding and stacker mechanisms may be employed in connection with the present invention, since it is the novel structure located at the intermediate station 2 which comprise the principal elements of the present invention.

The top sheet 3 in supply stack 1 is fed in the direction of arrow 4 to the intermediate station 2 at which location the printing operation is performed. The initial or starting postion of sheet 3 at the intermediate station is indicated by solid outline 5. The starting position is electrically sensed by two pairs of photocells (6—7 and 8—9). In the starting position, the lower edge of the record intercepts a pair of light beams from light source (10) impinging on photocells 6 and 7. The right-hand edge (as viewed in FIGURE 1) is sensed by photocells 8 and 9 receiving light from a pair of associated light sources 11 and 12. Motion along the X axis, indicated by arrow *4a*, is imparted to the record at station 2 by a pair of drive rollers and a corresponding pair of pressure capstans. The drive rollers are located above the upper surface of the record and the pressure capstans are located adjacent the under surface of the record. Each drive roller comprises a pair of drive capstans rotatably carried on a common shaft.

It should be understood that the X-axis drive capstans 13 and 14 employed to move the record from left to right are complemented by a similar contra-rotating pair of X-axis drive capstans 15 and 16 which are used to drive the record from right to left.

That is, the X-axis drive comprises two pairs of capstans, one pair of which is continuously driven in a clockwise direction (15 and 16) and the other is continuously rotated in a counter-clockwise direction (13 and 14). The motor necessary to impart the necessary rotary motion to these capstan shafts is not shown since such motor may be any one of the numerous devices suitable for performing this function well known in the art. Therefore, it is deemed unnecessary to show details of this structure, it being considered that the disclosure provided herein is sufficiently detailed as to permit practice of the invention by those skilled in the art.

Two pairs of capstans are also provided for the Y-axis drive. Capstans 17 and 18 provide for motion from bottom to top, whereas capstans 19 and 20 permit movement of the record from top to bottom. As can be seen in FIGURE 1, capstans 17—20 are arranged at right angles to capstans 13—16. The orthogonal arrangement will be referred to, hereinafter, generally as the X drive and the Y drive; a detailed discussion of the X drive will follow, it being understood that the structure of the Y drive is identical except for geometric orientation.

While each pair of capstans rotate continuously on a common shaft, individual and separately controlled pressure capstans are employed in combination with the twin drive capstans.

The drive capstans are continuously rotating but there is provided a small clearance, on the order of a few thousands of an inch, between the surface of capstans 13—20 and the upper surface of the record located at the intermediate station 2. Looking now at FIGURE 3, it can be seen that pressure capstans 21 and 22 are supported in yokes 23 and 24, respectively. Yokes 23 and 24 may be moved upward upon energization of associated solenoids 25 and 26, respectively. When energized, solenoid 25 will push pressure capstan 21 upward thereby pinching the record 27 between the drive capstan 15 and the pressure capstan 21 and thereby imparting a right-to-left driving motion to record 27. When solenoid 25 is de-energized, pressure capstan 21 drops down and the driving motion is no longer imparted to record 27. Similarly, left-to-right motion is imparted to record 27 by energizing solenoid 26. At this point, it should be noted that capstans 14 and 16 are similarly provided with pressure capstans.

Figures 2, 4:
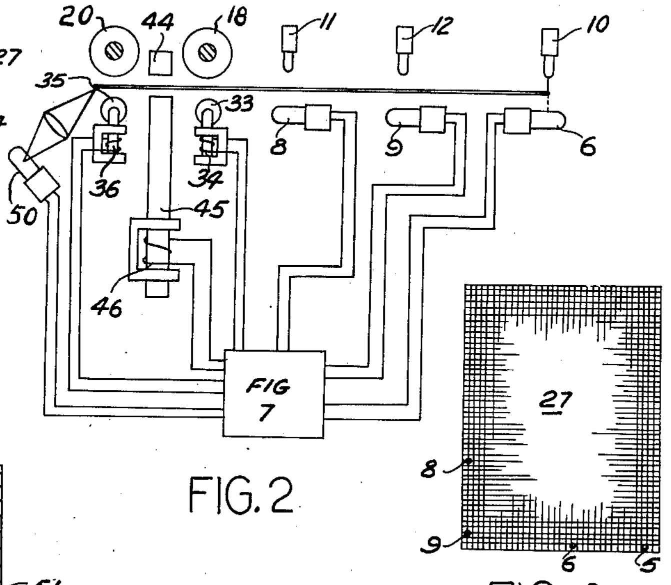
FIGURE 2 is a sectional view taken along line 2—2 of FIGURE 1.
FIGURE 4 illustrates the reverse side of the sheet record showing the grid lines used for position and skew-correction control.

A similar structure for moving the record along the Y axis, as indicated by arrow 32, is shown in FIGURE 2. Pressure capstan 33 and solenoid 34, when actuated, will move record 27 into engagement with Y-axis drive capstan 18. Similarly, pressure capstan 35 and solenoid 36 cooperate with drive capstan 20 to reverse the motion of record 27 along the Y axis (these elements also shown in FIGURE 6). Drive capstan 19, located on the same shaft with capstan 20, cooperates with pressure capstan 37 and solenoid 38.

The individual control of the pressure capstan cooperating with capstans 15 and 16 (or 13 and 14) provides a means whereby skewing of the sheet may be overcome. Normally, pairs of pressure capstans are actuated simultaneously to move the record along a given axis. For example, if record 27 is to be moved from right-to-left along the X axis (*4a*), the pressure capstans cooperating with capstans 15 and 16 are energized simultaneously. In the event that the record 27 should inadvertently become misaligned or skewed, one or the other of the pressure capstans is energized for a different interval (longer or shorter, as required) until re-alignment is achieved.

A braking mechanism is interlocked with the drive mechanism so that motion of the record will be positively arrested whenever the drive capstans are not in driving engagement with the record. The electrical control circuitry for effecting this brake interlock will be discussed in detail with reference to FIGURE 7, in a subsequent section of this specification.

Referring again to FIGURE 3, there is shown the structural details of the X-axis braking mechanism. Stationary pressure pad 39 is fixedly mounted above the upper surface of record 27, and is separated therefrom by a very small clearance. Brake pressure pad 40 is located in opposition to pad 39 beneath, and spaced apart from the lower surface of record 27. Brake pad 40 is coupled to brake solenoid 41 so that upon energization of solenoid 41, pad 40 will move upward and force record 27 into engagement with pressure pad 39. This action will cause record 27 to come to rest and will thereafter prevent its movement until solenoid 41 is de-energized.

Each capstan is provided with a braking system comprising a stationary pressure pad and a brake pressure pad, as described in the preceding paragraph; these are located at 39, and 42—44. The brake pad and solenoid for stationary pressure pad 44 are shown at 45 and 46, respectively.

It should be understood that individual brake pads and related control mechanisms may be used in conjunction with, or in place of, the pressure capstans to prevent skew.

There is provided means for continuously sensing the position of the sheet, thereby providing feed-back control to the drive system. The reverse side of each record sheet is pre-printed with coordinate grid lines, a portion of which are shown in FIGURE 4, which may be photoelectrically scanned to generate position data. By sensing successive grid lines as the record moves and controlling the drive in response thereto, the record may be advanced to successive character printing positions. Inasmuch as the X and Y grid lines are printed in an orthogonal relationship, skew may be sensed therefrom. The drive control circuitry will be discussed in detail in connection with FIGURE 7.

Four photocells (47–50) are employed to sense to grid pattern on the reverse side of the record. Photocells 47 and 48 are employed for sensing the vertical grid lines to control motion along the X axis and the remaining two photocells 49 and 50 are employed for sensing the horizontal grid lines for controlling motion along the Y axis. Each of these two pairs of photocells control a corresponding capstan and a corresponding brake. Whenever a photocell senses a line, it will release its corresponding capstan and apply the brake. Thus, when advancing the record to a successive position to print a character, a control signal energizes both X-axis capstan solenoids 15 and 16 and releases the X-axis brakes 39 and 42. The record 27 will then move until photocells 47 and 48 sense the next vertical grid line at which time capstans 15 and 16 are released and brakes 39 and 42 are actuated. At this instant, the record 27 has arrived at the position at which the next character is to be printed.

Paper skew is prevented by having each photocell of a pair separately control its corresponding capstan drive solenoid and brake. Since each photocell independently operates its corresponding brake solenoid to release the capstan when it senses a grid line, if the paper should skew, it would automatically become straightened out by the continued drive motion permitted by the one or the other photocell remaining energized until the grid becomes "straightened."

Figure 5:
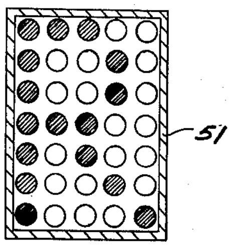
FIGURE 5 illustrates the wire matrix configuration of a wire printer mechanism suitable for use in the invention.
Figures 6, 7:
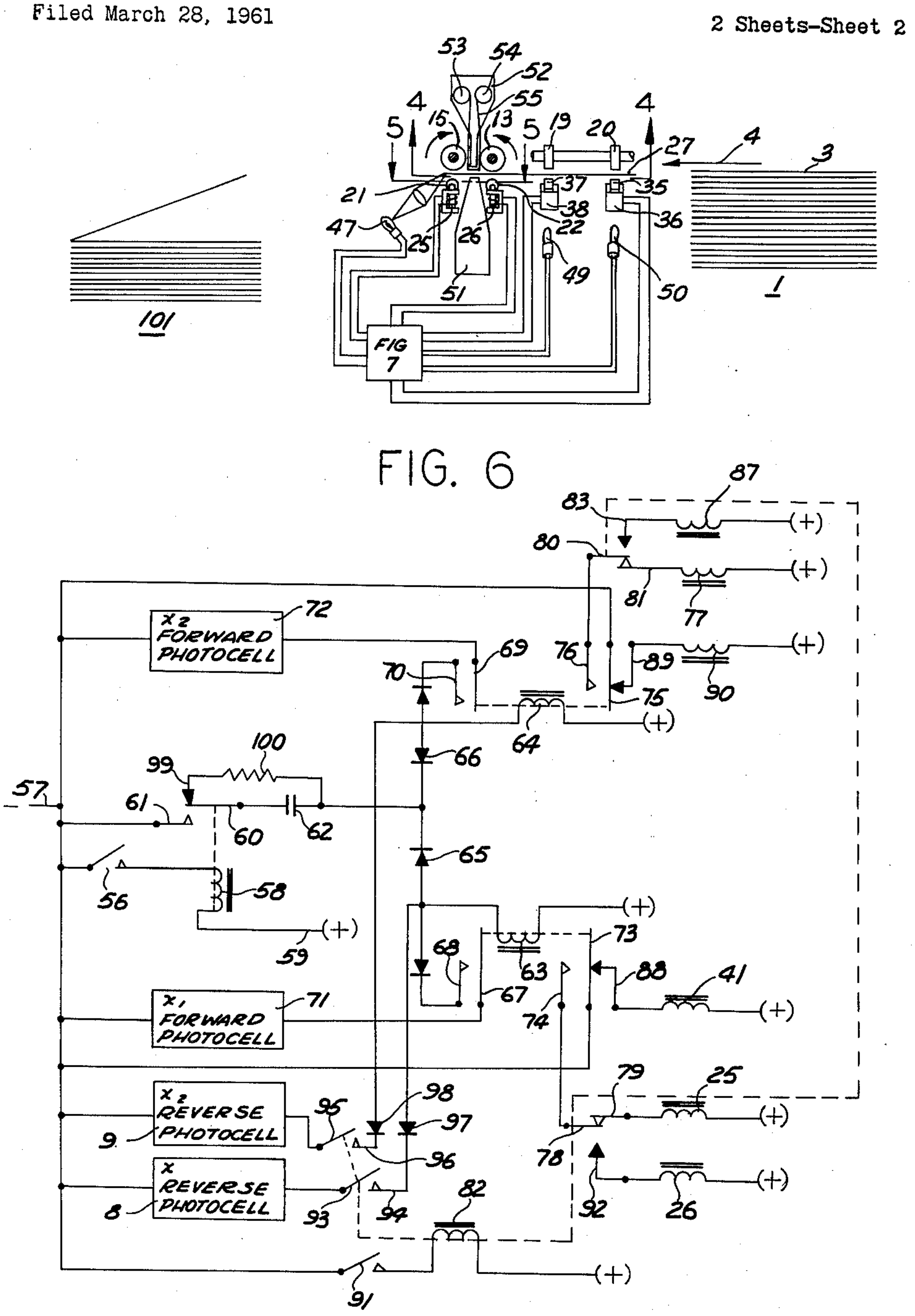
FIGURE 6 is a cross section view taken along lines 6—6 of FIGURE 1.
FIGURE 7 is schematic diagram of the control circuitry of the apparatus of FIGURES 1, 2 and 6.

Looking now at FIGURE 5, there is shown a sectional view, taken along line 5—5 of FIGURE 6, showing a single 5 x 7 wire matrix printer located at the fixed print station 51. Apparatus of this type is well known to those skilled in the art and accomplishes the printing of an image of an alpha-numeric character by selective actuation of combinations of the 35 available wires comprising the matrix. Typically, each wire is actuated by a corresponding electromagnet which mechanically displaces the wire to provide a raised dot pattern corresponding to the desired character. The paper is then pressed between the dot matrix and an inked ribbon, or the like, to result in an impression on the record of the dot pattern defining the selected character. Electrical input to the 35 electromagnets for actuating the matrix is accomplished by a suitable external encoder.

In FIGURE 5, the wires comprising the alphabetic character "R" are shown actuated. The dot pattern resulting is obtained by projecting selected wires from those remaining. When this raised pattern is sharply pressed against the record and the record pressed against an inked ribbon, the selected character will be imprinted on the record. The inker, indicated generally as 52, may comprise a supply spool 53 and a take-up spool 54, upon which are wound an inked ribbon. Structural details, such as means for advancing the take-up spool are not shown since this portion of the apparatus is conventional and well known to those versed in the art.

It should be understood that any suitable and well-known printer mechanism may be employed in lieu of the wire matrix type discussed above. For example, the moving wire matrix may be replaced by a stationary wire matrix wherein printing is accomplished by selectively applying electric potentials to the wires and by using record paper which is treated to be responsive to an electric potential to produce visible markings. Alternately, the wire matrix may be replaced by a rotating print wheel carrying the alpha-numeric characters. Other variations will become apparent to those skilled-in-the-art.

Looking now at FIGURE 7, there is shown a simplified control circuit suitable for operation of a single axis drive; in this instance, the X-axis drive is shown. It should be understood that an identical control circuit is employed for the Y axis drive, it being considered unnecessary to show both axes. As has been explained earlier, the apparatus of the present invention is primarily useful as an adjunct to related business machine equipment and that the illustrative example described hereinabove relates to the use of the apparatus in a high-speed serial printer. As will be apparent to those skilled in the art, data are obtained from the related equipment which will control the wire printer matrix, etc. Similarly, this related equipment will provide a sequencing control signal which is interlocked with the print matrix control signals to indicate the commencement of record drive to be performed by the apparatus of the present invention. Specifically, the record drive cycle commences with the signal input to the wire printer matrix. This signal may comprise a power circuit closure of feed contact 56. This action will complete a circuit from the negative terminal 57 of the power supply through time delay relay 58 and thence to the positive terminal 59 of the power supply. Energization of time delay relay 58 will close contact 60 to contact 61 thereby supplying a pulse through capacitor 62 to X1 drive relay 63 and X2 drive relay 64 via checking diodes 65 and 66, respectively. This pulse will momentarily energize relays 63 and 64 and pick up contacts 67—68 and 69—70 which will thereafter self-hold relays 63 and 64 energized. The self-hold circuit is completed via contacts 67—68, 69—70 and the X1 and X2 forward photocell circuits 71 and 72 (assuming that X1 and X2 forward photocells 47 and 48 are not sensing a grid line on the reverse side of the record). This action will also close contacts 73—74 and 75—76 which will in turn energize X1 forward pressure capstan solenoid 25 and the X2 forward capstan solenoid 77. This circuit is completed via normally closed contacts 78—79 and 80—81 on the X-reverse relay 82. While the X1 and X2 forward solenoids 25 and 11 are energized, contacts 80—83 and 78—92 on X-reverse relay 82 will be open, thereby de-energizing the X1 and X2 reverse drive solenoids 87 and 26. When either of the forward photocells 71 and 72, or both of these photocells, senses a grid line, the holding circuit via contacts 67—68 and/or 69—70 will be opened causing relay 63 and/or 64 to drop out. De-energization of relay 63 or 64 will result in the associated contacts 73—88 and/or 75—89 to be closed, thus energizing the corresponding brake solenoid (41 and/or 90), and de-energizing the corresponding forward capstan solenoid 25 and/or 77. As can be seen, the negative power supply terminal 57 connects to the arm contacts 73 and 75 of relays 63 and 64 thus providing an "exclusive" interlock circuit between the forward capstan solenoids 25 and 77 and the brake solenoids 41 and 90. Similarly, the arm contacts 78 and 80 are exclusively interlocked so that the forward capstan solenoids 25 and/or 77 and the reverse capstan solenoids 26 and/or 90 cannot be simultaneously energized. After a given number of grid lines along the X axis has been completed, as determined by suitable circuits within the related equipment, an innerlock signal will be provided calling for reverse drive. This will permit the record to be returned to the right-hand margin so that the Y-axis drive circuitry may be energized to space the record up to the next position for printing the next succeeding horizontal row of characters. The control is then returned to the X-axis drive circuit.

Reverse motion along the X-axis is accomplished as follows. The signal from the related equipment will result in closure of the X reverse switch 91 and energization of X-reverse relay 82. X-reverse relay 82 will then pick up contacts 78—92 and contacts 80—83. Closure of contacts 93—94 and 95—96 will energize X1 and X2 relays 63 and 64 which will then energize the reverse capstan solenoids 26 and 87 until such time as the X reverse photocells 8 and 9 sense the edge of the record. This action will open the photocell circuit (8 and 9) via checking diodes 97 and 98 causing relays 63 and 64 to drop out. De-energization of relays 63 and 64 will cause reverse capstan solenoids 26 and 87 to become de-energized and brake solenoids 41 and 90 to become energized.

Following the above-described sequence of operations, a new row of characters may be printed by the initiation of an X-forward drive sequence as first described above.

The start drive signal from the related equipment which energizes relay 58 comprises a synchronized impulse; once the drive cycle is initiated by the pulse through capacitor 62, contact 60 will close to contact 99 thus discharging capacitor 62 via resistor 100.

Y-axis motion or vertical drive of the record is performed by substantially identical circuits as that described above in connection with the X-drive motion. In this latter instance, the reverse motion of the record is automatically sensed and the reverse drive stopped by Y-reverse photocells 6 and 7.

Upon completion of all printing operations, the record 27 may be fed from the intermediate station 2 into an out hopper or stacker 101 in the direction of arrow 102; this function being performed by any suitable and well known sheet feed mechanism.

In the embodiment of the apparatus shown and described hereinabove, it is contemplated that the X-axis and the Y-axis drivers shall not be operated simultaneously. That is, the related business machine equipment should be so interlocked with the drive control circuits that the X-axis drive and the Y-axis drive will be operated sequentially. Inasmuch as sequential interlock means to accomplish this may be any one of numerous devices for this function well known in the art, it is deemed unnecessary to show circuitry details. Also, certain modifications of the drive mechanism may be made, as will be apparent to those skilled in the art, which would permit simultaneous X-axis and Y-axis drive motions to permit a vector direction to be imparted to the record.

Also, the orthogonal grid lines imprinted on the reverse side of the record may be replaced by invisible magnetically recorded lines which would be sensed by magnetic pick-up in lieu of the photocells shown. Other types of control signal generating means may be carried on the reverse side of the record, it not being necessary that photoelectric devices or physical markings be employed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention; therefore, to be limited only as indicated by the scope of the following claims.

What is claimed is:

1. Apparatus for orthogonally positioning any selected point on a sheet record to a fixed station comprising, first continuously rotating drive means normally spaced apart from the surface of said record, first selectively operable pressure capstan means responsive to a control signal for moving said record into driving engagement with said first drive means thereby imparting motion to said record in a first direction, second continuously rotating drive means normally spaced apart from said record, second selectively operable pressure capstan means responsive to a control signal for moving said record into driving engagement with said second drive means thereby imparting motion to said record in a direction perpendicular to, and in the same plane as, said first direction, and brake means interlocked with said first and second drive means for arresting motion of said record when said first and second drive means are disengaged from said record.

2. Apparatus as defined in claim 1 having first continuously rotating reverse drive means spaced apart from said record, third selectively operable pressure capstan means responsive to a control signal for moving said record into driving engagement with said reverse drive means thereby imparting motion to said record in a direction opposite to said first direction, second continuously rotating reverse drive means, and fourth selectively operable pressure capstan means responsive to a control signal for moving said record into driving engagement with said second reverse drive means thereby imparting motion to said record in a direction opposite to said second direction.

3. A bi-directional orthogonal drive system for positioning a selected point on a sheet record relative to a fixed station comprising, first and second continuously rotating drive capstans normally spaced apart from the surface of said record, first and second selectively operable pressure capstan means responsive to independent control signals for moving said record into driving engagement with selected ones of said first and second drive means thereby imparting motion to said record in a first general direction, brake means independently interlocked with said first and second drive means for arresting motion of said record when a corresponding one of said drive means are disengaged from said record.

4. The apparatus as defined in claim 3 having third and fourth continuously rotating drive capstans located perpendicular to, and in the same plane as, said first and second continuously rotating drive capstans, third and fourth independently operable pressure capstans responsive to corresponding control signals for moving said record into driving engagement with said third and fourth drive capstan thereby impairing motion to said record in a general direction at right angles to the general direction imparted by said first and second drive capstans, and second interlocked brake means for arresting motion of said record when said third and fourth drive capstans are disengaged from said record.

5. In combination, a sheet record, continuously rotating drive means normally spaced apart from a first surface of said record, pressure capstan means located adjacent the opposite surface of said record, solenoid means coupled with said pressure capstan means for causing said capstan means to engage the opposite surface of said record and move said record into driving engagement with said drive means, fixed brake pad means normally spaced apart from said first surface of said record, relatively movable brake means located adjacent the opposite surface of said record, and means for moving said movable brake means into engagement with the opposite surface of said record and thereby move said first surface of said record into engagement with said fixed brake pad means.

6. The combination as defined in claim 5 having interlocked control means coupled with said capstan engaging means and said brake moving means, whereby said capstan engaging means is always disengaged when said brake moving means is engaged.

7. The combination as defined in claim 6 having means responsive to a position of said record for operating said interlock control means.

8. In combination, a sheet record, first and second continuously rotating drive means normally spaced apart from the surface of said record, said first and second drive means being coplanar and mutually perpendicular, first and second pressure capstan means located adjacent the opposite surface of said record and inopposition to corresponding ones of said first and second drive means, first and second solenoid means coupled with said first and second pressure capstan means, respectively, for causing corresponding ones of said capstan means to engage the opposite surface of said record and move said record into driving engagement therewith.

9. The combination as defined in claim 8 having first and second fixed brake pad means normally spaced apart from said first surface of said record, first and second selectively operable brake means located adjacent the opposite surface of said record and in opposition to corresponding ones of said first and second brake means, and means for independently moving selected ones of said brake means into engagement with the opposite surface of said record and thereby move said first surface of said record into engagement with corresponding ones of said fixed brake pad means.

10. In a high speed serial printer having a supply stack for holding a plurality of sheet records, an intermediate print station for receiving a single record from said supply stack and a receiving hopper for receiving sheet records from said print station, a continuously rotating drive roller spaced apart from a record located at said print station, selectively operable pressure capstan means responsive to an external control signal for moving said record at said print station into driving engagement with said drive roller thereby imparting motion to said record, and brake means normally engaging said record and interlocked with said pressure capstan means for releasing said record whenever said drive roller is in engagement with said record.

11. A high speed serial printer as defined in claim 10 having a continuously rotating reverse drive spaced apart from said record, selectively operable reverse capstan means responsive to an external control signal for moving said record into driving engagement with said reverse drive thereby imparting a motion to said record in a direction opposite to that imparted to said record by said drive roller.

12. A high speed serial printer as defined in claim 11 including edge limit means for detecting the presence of the edge of said record at a fixed position, said limit means being interlocked with said reverse drive for arresting motion of said record in response to operation of said edge limit means.

13. A high speed serial printer as defined in claim 10 wherein said records are provided with control signal generating means carried on the reverse side of said records.

14. A high speed serial printer as defined in claim 13 wherein said control signal generating means comprise an orthogonal grid array printed on said record.

References Cited in the file of this patent

UNITED STATES PATENTS

| | | |
|---|---|---|
| 1,506,382 | Peirce | Aug. 26, 1924 |
| 2,178,304 | Holness | Oct. 31, 1939 |
| 2,984,482 | Kist et al. | May 16, 1961 |